(12) United States Patent
Wieszt et al.

(10) Patent No.: US 6,446,505 B1
(45) Date of Patent: Sep. 10, 2002

(54) METHOD FOR MONITORING THE REFRIGERANT FILLING LEVEL IN REFRIGERATING SYSTEM

(75) Inventors: Herbert Wieszt, Grafenau; Wolfgang Straub, Deggingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/618,232

(22) Filed: Jul. 18, 2000

(30) Foreign Application Priority Data

Jul. 27, 1999 (DE) .......................... 199 35 226

(51) Int. Cl.⁷ .................... G01F 23/00; F25B 49/00
(52) U.S. Cl. .................... 73/295; 62/126; 62/129
(58) Field of Search .................... 62/126, 129, 158; 73/295

(56) References Cited

U.S. PATENT DOCUMENTS

| | | | |
|---|---|---|---|
| 3,792,592 A | 2/1974 | Cook | 62/158 |
| 4,167,858 A | 9/1979 | Kojima et al. | 62/126 |
| 4,745,765 A | 5/1988 | Pettitt | 62/129 |
| 4,829,777 A | 5/1989 | Matsuoka et al. | 62/212 |
| 4,939,909 A | 7/1990 | Tsuchiyama et al. | 62/158 |
| 5,088,296 A | 2/1992 | Hamaoka | 62/174 |
| 5,140,826 A * | 8/1992 | Hanson et al. | 62/155 |
| 5,243,829 A * | 9/1993 | Bessler | 62/126 |
| 5,297,393 A * | 3/1994 | Thompsom | 62/129 |
| 5,454,229 A * | 10/1995 | Hanson et al. | 62/126 |
| 5,457,965 A * | 10/1995 | Blair et al. | 62/129 |
| 5,560,213 A * | 10/1996 | Wieszt | 62/125 |
| 5,713,213 A * | 2/1998 | Nobuta et al. | |

FOREIGN PATENT DOCUMENTS

| | | |
|---|---|---|
| DE | 44 01 415 C 1 | 12/1994 |
| DE | 4401415 | 10/1996 |
| EP | 0 837 293 A2 | 4/1998 |
| GB | 2227577 A | 8/1990 |
| JP | 01-095255 | 4/1989 |
| JP | 06-002998 | 1/1994 |

OTHER PUBLICATIONS

Combined Search & Examination Report from the European Patent Office dated Oct. 9, 2000.

* cited by examiner

Primary Examiner—Hezron Williams
Assistant Examiner—Katina Wilson
(74) Attorney, Agent, or Firm—Crowell & Moring LLP

(57) ABSTRACT

The invention relates to a method for monitoring the refrigerant filling level of a refrigerating system, in particular a motor vehicle air-conditioning system, with a compressor subdividing the refrigerant circuit into a high-pressure side and a low-pressure side. The evaporator temperature is determined at the evaporator at short time intervals by means of an evaporator temperature sensor. According to the invention, there is provision for a time meter, t, to be activated when the evaporator temperature exceeds a predetermined threshold temperature.

15 Claims, 1 Drawing Sheet

METHOD FOR MONITORING THE REFRIGERANT FILLING LEVEL IN REFRIGERATING SYSTEM

BACKGROUND OF THE INVENTION

1. Field of the Invention

The invention relates to a method for monitoring the refrigerant filling level in a refrigerating system, and more particularly to a method for monitoring the refrigerant level in an air conditioner having a compressor with a high pressure refrigerant circuit and a low pressure refrigerant circuit.

2. Description of the Related Art

DE 44 01 415 C1 describes a generic method for monitoring the refrigerant filling level in a refrigerating system, the refrigerating system having a compressor subdividing the refrigerant circuit into a high-pressure side and a low-pressure side. The relative pressure and the temperature are measured on the high-pressure side at time intervals, the measured pressure is used to determine an assigned temperature by means of a refrigerant-specific function and a refrigerant subcooling value Uw capable of being evaluated as a measure of the refrigerant filling level is determined by subtracting the measured temperature from the assigned temperature. At least during predeterminable operating phases of the refrigerating system, a maximum value Mw is used to assess the refrigerant filling level, and at the start of these operating phases, this maximum value is set at the subcooling value Uw last determined and, in the course of this operating phase, at a subcooling value newly determined in each case, when the latter is higher than the maximum value Mw prevailing at the corresponding time.

This type of method for monitoring the refrigerant filling level in a refrigerating system has the disadvantage that a refrigerant temperature sensor is required in the system in order to record the refrigerant temperature.

The present invention is aimed at one or more of the problems identified above.

BRIEF SUMMARY OF THE INVENTION

The object of the invention is to improve a method for monitoring the refrigerant filling level in a refrigerating system, in such a way that the need for costly sensor technology can be avoided.

The object is achieved, according to the invention, by means of the features of Claim 1. Advantageous refinements and developments of the subject of the invention are characterized by the features of the subclaims.

An essential advantage of these refinements is that, merely by observing the evaporator temperature already measured for other purposes, the filling level of the refrigerant can be monitored and, if there is an underfilling of refrigerant, the compressor can be switched off for protection.

BRIEF DESCRIPTION OF THE DRAWINGS

The invention is explained in more detail by means of an exemplary embodiment in conjunction with a Figure description.

DETAILED DESCRIPTION OF THE INVENTION

Figure 1:
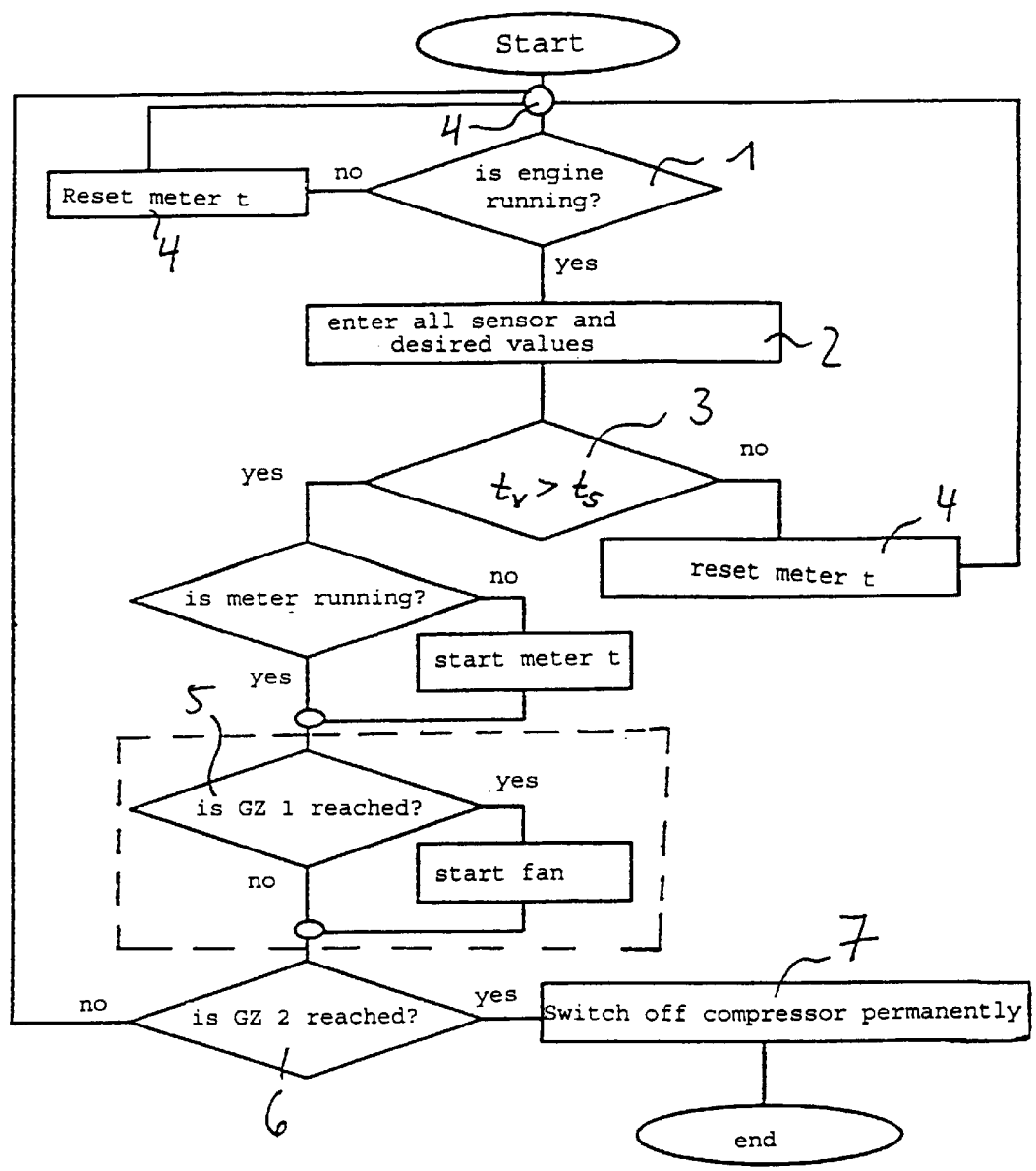
FIG. 1 shows a program flow of a method for monitoring the refrigerant filling level in a motor vehicle air-conditioning system.

FIG. 1 shows a program flow of a method for monitoring the refrigerant filling level in a motor vehicle air-conditioning system. The program is stored in an air-conditioning operating unit of the air-conditioning system. The motor vehicle air-conditioning system on which the method is based is of conventional design which has a regulated compressor. Moreover, the air-conditioning system has a condensor which is equipped selectively with or without a forced-ventilation facility. If the refrigerant quantity falls as a result of leakages in the system, there is no longer any cooling function beyond a specific refrigerant quantity. The lubricant quantity in the system also falls in parallel with the refrigerant. In order to prevent the compressor from jamming, the compressor is switched off beyond a refrigerant quantity which is still safe for the compressor. If the compressor were to continue to operate, it would be destroyed. The method is based on the fact that, if there is an underfilling of refrigerant in the air-conditioning system, it is no longer possible for sufficient refrigerant to be evaporated in order to reach the desired temperature in the evaporator, so that the evaporator temperature Tv rises. To start with, an enquiry 1 is made as to whether the engine is running. The engine drives the compressor. When the engine is running, the sensor values and desired values which are required for carrying out the method are determined in 2. For this purpose, the evaporator desired temperature Tvs and the evaporator actual temperature Tv and also the outside temperature Ta are determined at short time intervals (typically in the seconds range). Instead of the outside temperature Ta, in the circulating-air mode the circulating-air temperature Tu may also be used for evaluation. The enquiry 3 is made as to whether the evaporator temperature Tv exceeds a predetermined threshold temperature Ts. If this is not fulfilled, a time meter t is reset in 4. If the evaporator temperature Tv exceeds the threshold temperature Ts, a time meter t is activated, if it has not already been started. This meter t runs up to a predetermined limit time GZ2 in 6, if it has not previously been reset again because the evaporator temperature Tv has fallen below the threshold temperature Ts or because the engine is no longer in operation (enquiry 1). If the evaporator temperature Tv does not fall below the threshold temperature Ts up to the limit time GZ2, the compressor is switched off permanently in 7. Optionally, another enquiry 5 (bordered by broken lines) can be made after a predetermined limit time GZ1 after which forced ventilation of the condenser takes place. The compressor is switched off only when, after the limit time GZ2, the evaporator temperature Tv still exceeds the threshold temperature Ts in spite of forced ventilation. The threshold temperature Ts is formed as a fraction of the temperature difference between the outside temperature Ta or ambient temperature Tu and the evaporator desired temperature Tvs. The fraction is typically within the range of 0.4 to 0.6. In a further version, optionally, in the case of a vehicle air-conditioning system, when the vehicle is at a standstill or at a predetermined speed v the time meter t can be stopped or a limit time GZ2 prolonged according to the duration of the standstill or to the predetermined speed v can be determined.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for monitoring a refrigerant filling level in a refrigerating system of a motor vehicle air-conditioning system having a compressor that subdivides a refrigerant circuit into a high-pressure side and a low-pressure side, the method comprising:

determining an evaporator temperature at an evaporator, at short time intervals by means of an evaporator temperature sensor, activating a time meter is activated when the evaporator temperature exceeds a predetermined threshold temperature; and activating an auxiliary blower at a condenser when the time meter has reached a predetermined limit time and the evaporator temperature has not fallen below the threshold temperature up to the limit time;

whereby the filling level is monitored based on said evaporator temperature.

2. The method, as set forth in claim 1, wherein the time meter is reset to zero when the evaporator temperature falls below the threshold temperature.

3. The method, as set forth in claim 1, wherein:

one of an underfilling alert and a switch-off of the refrigerating system takes place when the time meter has reached a predetermined limit time and the evaporator temperature has not fallen below the threshold temperature up to the limit time.

4. The method, as set forth in claim 1, wherein the threshold temperature is formed as a fraction of the temperature difference between the ambient temperature and the evaporator desired temperature.

5. A method for monitoring a refrigerant filling level in a refrigerating system of a motor vehicle air-conditioning system having a compressor that subdivides a refrigerant circuit into a high-pressure side and a low-pressure side, the method comprising: determining an evaporator temperature being determined at an evaporator, at short time intervals by means of an evaporator temperature sensor, activating a time meter is activated when the evaporator temperature exceeds a predetermined threshold temperature;

resetting the time meter is reset to zero when the evaporator temperature falls below the threshold temperature; and activating an auxiliary blower at a condenser when the time meter has reached a predetermined limit time and when the evaporator temperature has not fallen below the threshold temperature up to the limit time;

whereby the filling level is monitored based on said evaporator temperature.

6. The method, as set forth in claim 5, wherein:

one of an underfilling alert and a switch-off of the refrigerating system takes place when the time meter has reached a predetermined limit time and the evaporator temperature has not fallen below the threshold temperature up to the limit time.

7. A method for monitoring a refrigerant filling level in a refrigerating system of a motor vehicle air-conditioning system having a compressor that subdivides a refrigerant circuit into a high-pressure side and a low-pressure side, the method comprising: determining an evaporator temperature at an evaporator at short time intervals by means of an evaporator temperature sensor, activating a time meter is activated when the evaporator temperature exceeds a predetermined threshold temperature; and at least one of an underfilling alert and a switch-off of the refrigerating system takes place when the time meter has reached a predetermined limit time and the evaporator temperature has not fallen below the threshold temperature up to the limit time;

whereby the filling level is monitored based on said evaporator temperature.

8. A method for monitoring a refrigerant filling level in a refrigerating system of a motor vehicle air-conditioning system having a compressor that subdivides a refrigerant circuit into a high-pressure side and a low-pressure side, the method comprising: determining an evaporator temperature being determined at an evaporator at short time intervals by means of an evaporator temperature sensor, activating a time meter is activated when the evaporator temperature exceeds a predetermined threshold temperature;

resetting the time meter is reset to zero when the evaporator temperature falls below the threshold temperature; and one of an underfilling alert and a switch-off of the refrigerating system takes place when the time meter has reached a predetermined limit time and the evaporator temperature has not fallen below the threshold temperature up to the limit time;

whereby the filling level is monitored based on said evaporator temperature.

9. A method for monitoring a refrigerant filling level in a refrigerating system of a motor vehicle air-conditioning system having a compressor that subdivides a refrigerant circuit into a high-pressure side and a low-pressure side, the method comprising: determining an evaporator temperature at an evaporator, at short time intervals by means of an evaporator temperature sensor, activating a time meter when the evaporator temperature exceeds a predetermined threshold temperature; and at a predetermined speed of the vehicle, the time meter is stopped or the predetermined limit time is prolonged according to the duration of a standstill or to the predetermined speed is determined;

whereby the filling level is monitored based on said evaporator temperature.

10. A method for monitoring a refrigerant level in a refrigerant circuit of a motor vehicle having a compressor that subdivides the refrigerant circuit into a high pressure side and a low pressure side, said method comprising:

measuring an actual evaporator temperature at an evaporator of said refrigerant circuit at short time intervals by way of an evaporator temperature sensor;

comparing the measured actual evaporator temperature to a predetermined threshold temperature; and activating a time meter when the actual evaporator temperature exceeds the predetermined threshold temperature; and activating at least one of an underfilling alert and switching off of the refrigerating system when the time meter reaches a second predetermined time limit and the actual evaporator temperature has not fallen below the threshold temperature;

whereby the filling level is monitored based on said evaporator temperature.

11. The method according to claim 10, further comprising resetting the time meter to zero when the actual evaporator temperature subsequently falls below the threshold temperature.

12. The method according to claim 11, further comprising activating an auxiliary blower at a condenser of the refrigerant circuit when the time meter reaches a first predetermined limit time and the actual evaporator temperature has not fallen below the threshold temperature.

13. The method according to claim 10, further comprising activating an auxiliary blower at a condenser of the refrigerant circuit when the time meter reaches a first predetermined limit time and the actual evaporator temperature has not fallen below the threshold temperature.

14. The method according to claim 10, wherein the threshold temperature is formed as a fraction of the temperature difference between an ambient temperature and a desired evaporator temperature.

15. The method according to claim 10, wherein when the vehicle is at a standstill, or at a predetermined speed of the vehicle, the time meter is stopped or the second predetermined limit time prolonged according to a duration of the standstill or to the predetermined speed.

* * * * *